United States Patent
Takahashi

(10) Patent No.: US 8,847,527 B2
(45) Date of Patent: Sep. 30, 2014

(54) CONTROL SYSTEM FOR A ROTARY MACHINE

(75) Inventor: Tomoya Takahashi, Anjo (JP)

(73) Assignee: Denso Corporation, Kariya (JP)

( * ) Notice: Subject to any disclaimer, the term of this patent is extended or adjusted under 35 U.S.C. 154(b) by 112 days.

(21) Appl. No.: 13/606,604

(22) Filed: Sep. 7, 2012

(65) Prior Publication Data
US 2013/0063057 A1    Mar. 14, 2013

(30) Foreign Application Priority Data

Sep. 13, 2011    (JP) .................................. 2011-199791

(51) Int. Cl.
| | | |
|---|---|---|
| H02P 21/00 | (2006.01) | |
| H02P 27/12 | (2006.01) | |
| H02P 21/14 | (2006.01) | |

(52) U.S. Cl.
CPC ............ *H02P 21/14* (2013.01); *H02P 21/0035* (2013.01); *H02P 27/12* (2013.01); *H02P 21/0003* (2013.01)
USPC ............ 318/400.02; 318/400.03; 318/400.07; 318/148; 307/9.1

(58) Field of Classification Search
USPC .......... 318/400.02, 400.03, 400.07, 148, 801, 318/811, 609; 307/9.1
See application file for complete search history.

(56) References Cited

U.S. PATENT DOCUMENTS

| | | | | |
|---|---|---|---|---|
| 7,489,099 | B2* | 2/2009 | Fujiwara et al. ............... | 318/609 |
| 8,063,596 | B2* | 11/2011 | Imura ...................... | 318/400.09 |
| 2007/0241715 | A1 | 10/2007 | Fujiwara et al. | |
| 2011/0006711 | A1* | 1/2011 | Imura et al. .............. | 318/400.07 |
| 2011/0169436 | A1* | 7/2011 | Takahashi et al. ......... | 318/400.3 |
| 2011/0193505 | A1* | 8/2011 | Matsuki et al. .......... | 318/400.02 |
| 2013/0049363 | A1* | 2/2013 | Smith et al. ..................... | 290/44 |

FOREIGN PATENT DOCUMENTS

| | | |
|---|---|---|
| JP | 2008-219982 | 9/2008 |
| JP | 2008-228419 | 9/2008 |
| JP | 2009-148017 | 7/2009 |

OTHER PUBLICATIONS

Matzen, T.N., Sensorless characteristics of hybrid PM Machines at zero and low speed, Sep. 20-24, 2009, Energy Conversion Congress and exposition, IEEE, pp. 2374-2380, DOI:10.1109/ECCE.2009.5316205.*

Office Action (2 pages) dated Aug. 20, 2013, issued in corresponding Japanese Application No. 2011-199791 and English translation (2 pages).

H. Sugimoto et al., "Theory and Design of an AC Servo System", Sougou Denshi Shuppan Sha., Jul. 10, 2005 (7th version), pp. 72-82, with spot translation.

(Continued)

*Primary Examiner* — Paul Ip
*Assistant Examiner* — Bickey Dhakal
(74) *Attorney, Agent, or Firm* — Nixon & Vanderhye PC

(57) ABSTRACT

An estimation section calculates estimated currents corresponding to switching modes, which are provisionally set by a mode setting section. A mode determination section determines one of modes, which has a smallest difference between the estimated currents and command currents, to be a final switching mode. A drive section drives an inverter in the switching mode determined by the determination section. The estimation section uses transient-state inductances as coefficients of time differentiation of currents in voltage equations used for estimation of the estimated currents. These are different from steady-state inductances, which are coefficients of multiplication of currents and electric angular velocity.

13 Claims, 13 Drawing Sheets

(56) References Cited

OTHER PUBLICATIONS

J. Nakatsugawa et al., "Proposal of Mathematical Model of Permanent Magnet Synchronous Motor in Consideration of Magnetic Saturation and D-q Axes Interference", Research Meeting of Electric Association, Industrial Application Division, 2009, pp. [I-715] to [I-720], with spot translation.

* cited by examiner

| SWITCHING MODE | TURNED-ON SW | | |
|---|---|---|---|
| 0 | Sun | Svn | Swn |
| 1 | Sup | Svn | Swn |
| 2 | Sup | Svp | Swn |
| 3 | Sun | Svp | Swn |
| 4 | Sun | Svp | Swp |
| 5 | Sun | Svn | Swp |
| 6 | Sup | Svn | Swp |
| 7 | Sup | Svp | Swp |

| T* | SMALL ⟵⟶ LARGE |
|---|---|
| Lqs | LARGE ⟵⟶ SMALL |
| Lqt | ⟵ Lqt=Lqs ⟶ ⟵ Lqt<Lqs ⟶ |

T*↗ ⟹ Lqt↘

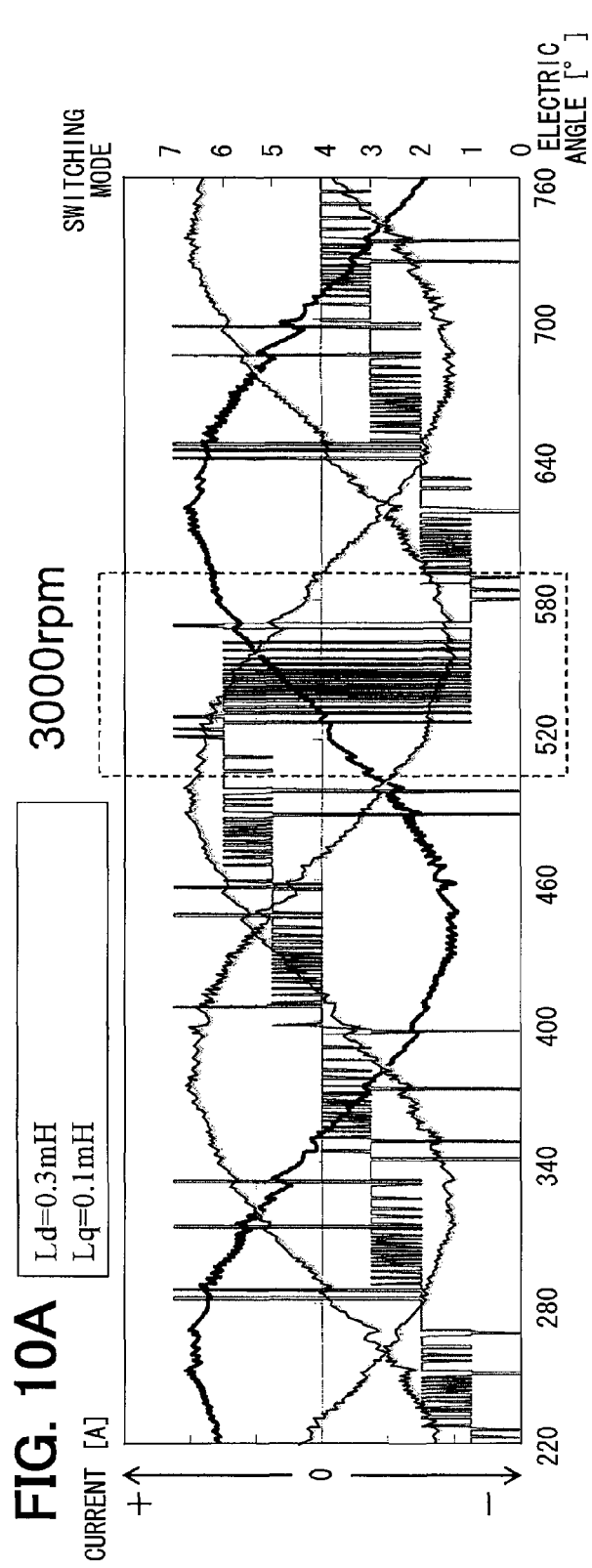
FIG. 10A
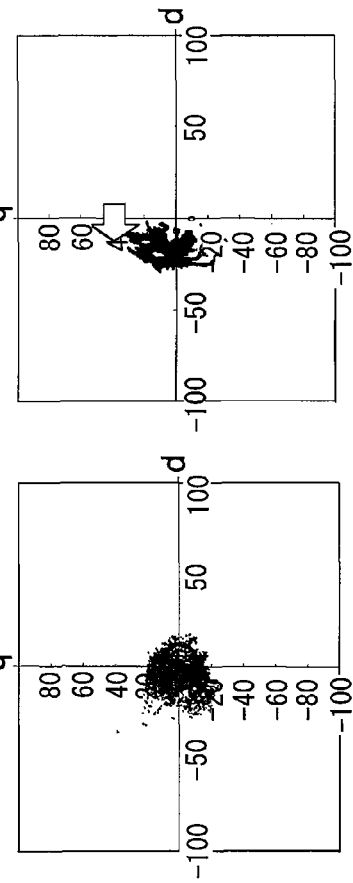
FIG. 10B
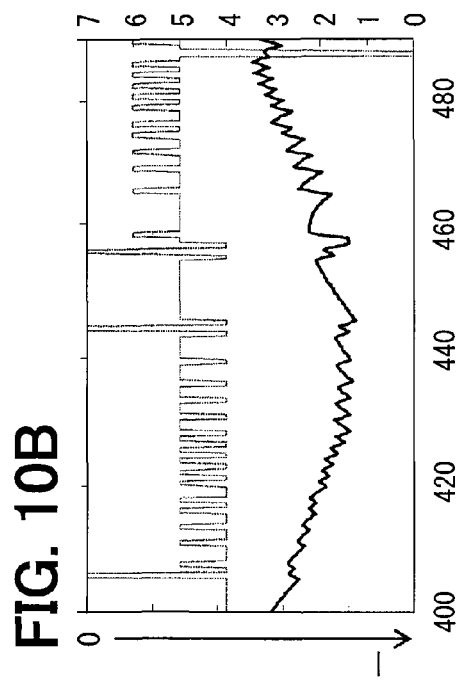
FIG. 10C
FIG. 10D

CONTROL SYSTEM FOR A ROTARY MACHINE

CROSS REFERENCE TO RELATED APPLICATION

This application is based on and incorporates herein by reference Japanese patent application No. 2011-199791 filed on Sep. 13, 2011.

FIELD

The present disclosure relates to a control system for a rotary machine, which controls a control amount including at least one of current, torque and magnetic flux of the rotary machine by turning on and off switching devices of a power conversion circuit. The switching devices of the power conversion circuit turn on and off connection of voltage supply sections, which supply respective voltages different one another, and terminals of the rotary machine.

BACKGROUND ART

A conventional control system for a rotary machine performs current feedback control, in which command voltages of the d-axis and the q-axis as operation amounts for feedback-controlling currents of the d-axis and the q-axis to command currents. Specifically, each of the command voltages is calculated as a sum of a proportional term and an integral term, which inputs a difference between a current flowing in a rotary machine and a command current. An optimum value of each gain of the proportional term and the integral term varies with a resistance and an inductance in a voltage equation, which defines a relation between a current and a voltage of the d-axis and the q-axis (non-patent document 1). The inductance of the rotary machine varies with a current flowing in the rotary machine. The gain is therefore variably set in accordance with an operating condition of the rotary machine.

Model estimation control is also proposed recently as a replacement of the above-described current feedback control. According to the model estimation control, a plurality of switching modes is provisionally set in correspondence to on/off operations of switching devices of an inverter. A current is estimated for each of the switching modes and an optimum switching mode is selected based on the estimated current. The current is estimated by using the voltage equation, which defines the relation between the current and the voltage of the d-axis and the q-axis.

[Patent document 1] JP 2008-228419A

[Non-patent document 1] "Theory and Design of an AC Servo System" authored by Hidehiko Sugimoto, published by Sougou Denshi Shuppan Sha, pages 72-82.

It was found by the inventor that, in performing the model estimation control, the accuracy of estimation of current degrades as the current flowing in the rotary machine flows. It was also found that the degradation of the accuracy of estimation cannot be countered sufficiently as in the case of the current feedback control even if the inductance in the voltage equation is varied.

SUMMARY

It is an object to provide a novel control system for a rotary machine, which controls a control amount including at least one of current, torque and flux linkage of the rotary machine by turning on and off switching devices of a power conversion circuit. The switching devices of the power conversion circuit turn on and off connection of voltage supply sections, which supply respective voltages different one another, and terminals of the rotary machine.

According to one aspect, a control system for a rotary machine comprises a power conversion circuit, an estimation section, a determination section and a drive section.

The power conversion circuit includes switching devices and controls a control amount including at least one of current, torque and flux linkage of the rotary machine by turning on and off the switching devices. The switching devices turn on and off connection of voltage supply sections, which supply respective voltages different one another, and terminals of the rotary machine. The estimation section sets provisionally switching modes indicating an on/off condition of each of the switching devices and estimates a control amount with respect to each of the switching modes. The determination section determines a switching mode based on an estimation result of the estimation section. The determined switching mode is used to actually drive the power conversion circuit. The drive section drives the power conversion circuit in correspondence with the determined switching mode. The estimation section estimates a control amount or a change amount based on inductance information of the rotary machine. The control amount is an object of estimation by the estimation section, and the change amount corresponds to the switching mode provisionally set for a parameter for calculating the control amount. The inductance indicated by the inductance information has a value, which is different from a ratio between the current flowing in the rotary machine and the flux linkage.

According to another aspect, a control system for a rotary machine comprises a power conversion circuit, an estimation section, a determination section, a drive section. The power conversion circuit, the determination section, and the drive section in another aspect are the same as in one aspect. The estimation section however includes an average voltage calculation section, an instantaneous voltage calculation section and a change amount estimation section.

The average voltage calculation section inputs the current flowing in the rotary machine and calculates an average value of an output voltage of the power conversion circuit based on a steady-state inductance indicated by the inductance information. The instantaneous voltage calculation section calculates an instantaneous voltage as a difference of the output voltage of the power conversion circuit corresponding to the provisionally set switching mode relative to the average value calculated by the average voltage calculation section. The change amount estimation section estimates a control amount or a change amount based on a transient-state inductance, which is different from the steady-state inductance and indicated by the inductance information, and the instantaneous voltage. The control amount is an object of estimation by the estimation section, and the change amount corresponds to the switching mode provisionally set for a parameter for calculating the control amount.

BRIEF DESCRIPTION OF THE DRAWINGS

The above and other objects, features and advantages of the present invention will become more apparent from the following detailed description made with reference to the accompanying drawings. In the drawings:

FIGS. 10A, 10B, 10C and 10D are charts and graphs showing a further example of operation result of the comparative;

DETAILED DESCRIPTION OF THE EMBODIMENT (First Embodiment)

A first embodiment of a control system for a rotary machine according will be described below. In the first embodiment, the control system is applied to a rotary machine provided as an in-vehicle main machine.

Figure 1:
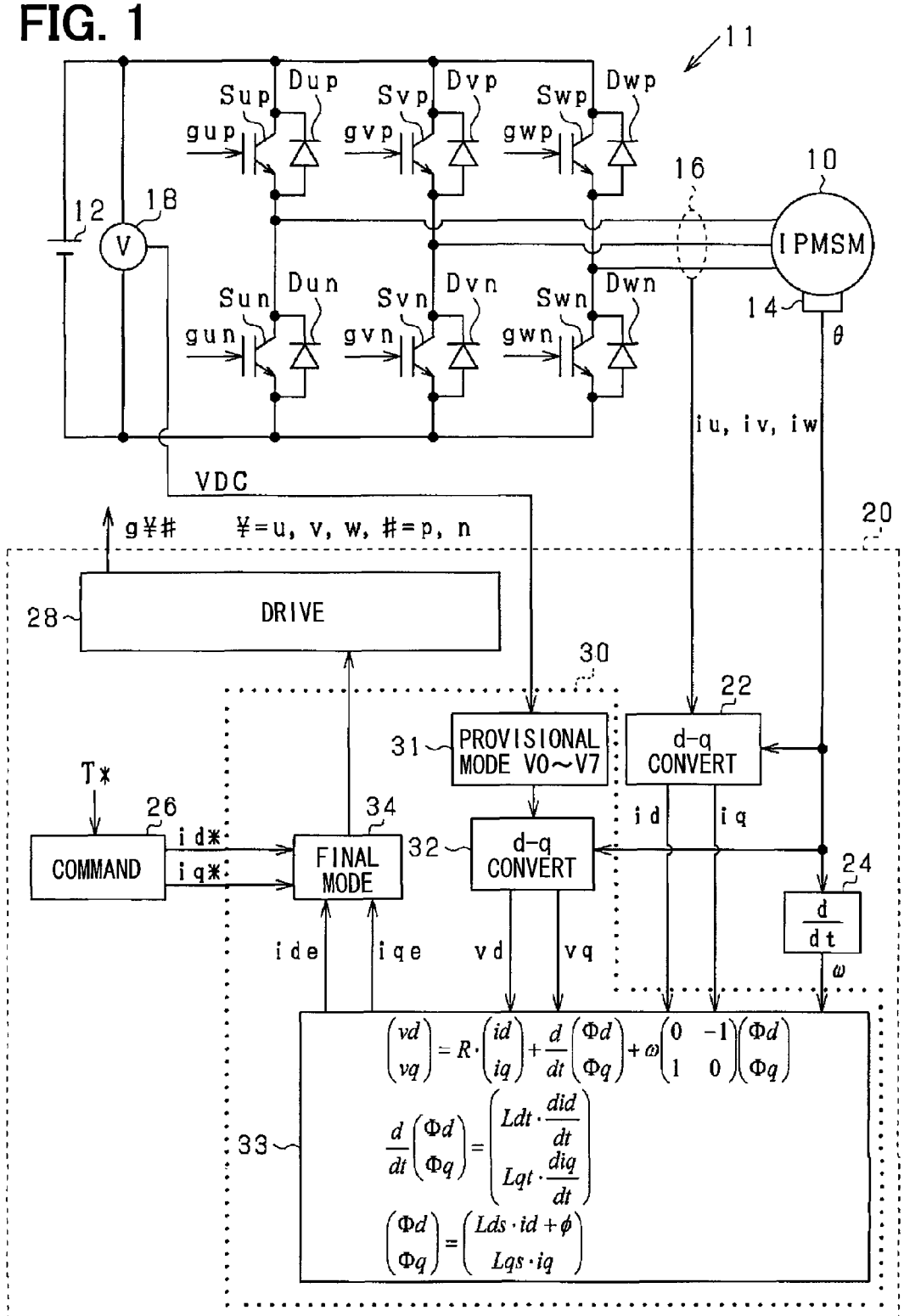
FIG. 1 is a system diagram showing a first embodiment of a rotary machine control system.

Referring to FIG. 1, a motor/generator 10 is a three-phase permanent magnet synchronous motor and provided as an in-vehicle main rotary machine. The motor/generator 10 is a rotary machine having salient poles (salient machine). Specifically, the motor/generator 10 is an interior permanent magnet synchronous motor (IPMSM).

The motor/generator 10 is connected to a high voltage battery 12 through an inverter 11. The inverter 11 has three sets of series-connected arms of switching devices S¥p and S¥n (¥Y=u, v, w). Junctions in these series-connected arms are connected to a U-phase, a V-phase and a W-phase of the motor/generator 10, respectively. An insulated-gate bipolar transistor (IGBT) is used as the switching device S¥# (¥=u, v, w; #=p, n). A diode D¥# is connected in parallel to each switching device.

The following detection sections are provided for detecting states of the motor/generator 10 and the inverter 11. A rotation angle sensor 14 is provided for detecting a rotation angle (electric angle θ) of the motor/generator 10. A current sensor 16 is provided for detecting currents iu, iv and iw flowing in respective phases of the motor/generator 10. A voltage sensor 18 is provided for detecting an input voltage (power supply voltage) of the inverter 11.

Detection values of these sensors 14, 16, 18 are inputted to a control apparatus 20, which forms a low voltage system, through an interface (not shown). The control apparatus 20 generates and outputs drive signals, which drive the inverter 11, based on the detection values of these sensors. The signal for driving the switching device S¥# of the inverter 11 is identified as g¥#.

The control apparatus 20 drives the inverter 11 to control torque of the motor/generator 10 to a demand torque T*. Specifically, it drives the inverter 11 so that the current flowing in the motor/generator 10 equals a command current, which is determined to attain the demand torque T*. Although the torque of the motor/generator 10 is a final control amount, the current flowing in the motor/generator 10 is controlled to the command current assuming that the current flowing in the motor/generator 10 is a final control amount, which is controlled directly to control the torque.

The control apparatus 20 performs model estimation control, which determines actual switching modes of the inverter 11, for controlling the current flowing in the motor/generator 10 to the command current. Specifically, the current of the motor/generator 10 is estimated by provisionally setting the switching mode to each of plural switching modes.

Figures 2A, 2B:
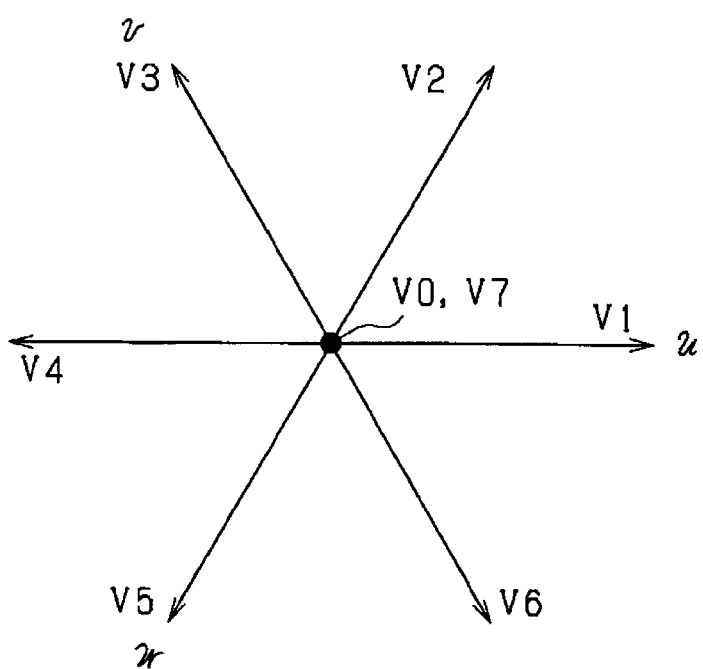
FIGS. 2A and 2B are diagrams showing switching modes.

The switching modes indicate whether each switching devices S¥# of the inverter 11 is turned on or off. As shown in FIG. 2B, eight switching modes 0 to 7 are provided. For example, all the switching devices Sun, Svn and Swn at the low potential side are turned on in the switching mode 0. All the switching devices Sup, Svp and Swp at the high potential side are turned on in the switching mode 7. In the switching modes 0 and 7, all the phases of the motor/generator 10 are short-circuited and the voltage supplied from the inverter 11 to the motor/generator 10 is zero. As a result, the output voltage vector of the inverter 11 is set to a zero voltage vector.

The remaining six switching modes 1 to 6 set drive patterns, in which at least one of the switching devices in each of the high potential side and the low potential side is turned on. As a result, the output voltage vector of the inverter 11 is an effective voltage vector.

Voltage vectors V0 to V7 are shown in correspondence to the switching modes 0 to 7, respectively, in FIG. 2B. The voltage vectors V0 to V7 indicate the output vectors of the inverter 11 outputted in the switching modes 0 to 7, respectively. The voltage vectors V1, V3 and V5 corresponding to the switching modes 1, 3 and 5 correspond to the positive sides of the U-phase, the V-phase and the W-phase, respectively, as shown in the figure.

The model estimation control will be described in detail below.

The actual currents iu, iv and iw detected by the current sensor 16 shown in FIG. 1 are converted by a d-q conversion section 22 into actual currents id and iq, which are currents of a d-axis and a q-axis in a rotating coordinate system. The rotation angle (electric angle θ) detected by the rotation angle sensor 14 is inputted to a velocity calculation section 24 to calculate a rotation velocity (electric angular velocity ω). A command current setting section 26 inputs a demand torque T* and outputs command currents id* and iq* in a d-q coordinate system. The command currents id*, iq*, the actual currents id, iq, the electric angular velocity ω and the electric angle θ are inputted to a model estimation control section 30. The model estimation control section 30 determines the switching mode of the inverter 11 based on these input parameters and output it to a drive section 28. The drive section 28 generates the drive signal g¥# based on the inputted switching mode and outputs it to the inverter 11.

Processing of the model estimation control section 30 will be described in detail next. In a provisional mode setting section 31, the switching mode of the inverter 11 shown in FIG. 2A is set provisionally. This processing provisionally sets the voltage vector, which correspond to the switching mode, in actuality. In a d-q conversion section 32, the voltage vector vdq=(vd, vq) in the d-q coordinate system is calculated by converting the voltage vector provisionally set in the mode setting section 31. For performing such conversions, the voltage vectors V0 to V7 provisionally set in the model setting section 31 may be expressed as VDC/2 and −VDC/2 in case that the high side arm is turned on and the low side arm is turned on, respectively. In this instance, the voltage vector V0 is expressed as (−VDC/2, −VDC/2, −VDC/2) and the voltage vector V1 is expressed as (VDC/2, −VDC/2 and −VDC/2).

In an estimation section 33, the currents id, iq are estimated based on the voltage vector (vd, vq), the actual currents id, iq and the electric angular velocity ω, assuming that the switching mode of the inverter 11 is provisionally set by the mode setting section 31. This estimation is made for each of the plural switching modes provisionally set by the mode setting section 31.

In a final mode determination section 34, the final switching mode of the inverter 11 is determined based on the estimated currents ide, iqe estimated by the estimation section 33 and the command currents id*, iq*. The drive section 28 generates the drive signal gΥ# based on the determined switching mode and outputs it.

In the estimation section 33, the estimated currents ide, iqe are calculated by the estimation processing performed based on a model equation expressed by the following equations (c1) and (c2).

$$vd = R \cdot id + Ldt \cdot (did/dt) - \omega \cdot Lqs \cdot iq \tag{c1}$$

$$vq = R \cdot iq + Lqt \cdot (diq/dt) + \omega \cdot Lds \cdot id + \omega \cdot \phi \tag{c2}$$

Here, R is a resistance, $\phi$ is an armature flux linkage constant, Lds is a d-axis steady-state inductance, Ldt is d-axis transient-state inductance, Lqs is a q-axis steady-state inductance and Lqt is a q-axis transient-state inductance.

The above equations (c1) and (c2) may be derived as follows. Three-phase voltage equations are expressed by the following three equations (c3) to (c5) by using the flux linkage $\Phi u$, $\Phi v$ and $\Phi m$ of each phase. The flux linkage means interlinkage magnetic flux.

$$vu = R \cdot iu + (d\Phi u/dt) \tag{c3}$$

$$vv = R \cdot iv + (d\Phi v/dt) \tag{c4}$$

$$vw = R \cdot dw + (d\phi w/dt) \tag{c5}$$

By d-q converting the equations (c3) to (c5), the following equations (c6) and (c7), which uses the flux linkage $\Phi d$ and $\Phi q$ of the d-axis and the q axis, are derived.

$$vd = R \cdot id + (d\Phi d/dt) - \omega \cdot \Phi q \tag{c6}$$

$$vq = R \cdot iq + (d\Phi q/dt) + \omega \cdot \Phi d \tag{c7}$$

By defining $d\Phi d/did = Ldt$ in the above-described equation $d\Phi d/dt = (d\Phi d/did) \cdot (did/dt)$, the transient-state inductance Ldt of the d-axis is derived. By defining $d\Phi q/diq = Lqt$ in the above-described equation $d\Phi q/dt = (d\Phi q/diq) \cdot (diq/dt)$, the transient-state inductance Lqt of the q-axis is derived. By defining $\Phi d = Lds \cdot id + \phi$, the steady-state inductance Lds of the d-axis is derived. By defining $\Phi q = Lqs \cdot iq$, the steady-state inductance Lds of the q-axis is derived. The constant term $\phi$, which is not proportional to the d-axis current in the flux linkage $\Phi d$ of the d-axis, is a term of the flux linkage of a permanent magnet.

Figures 3, 4:
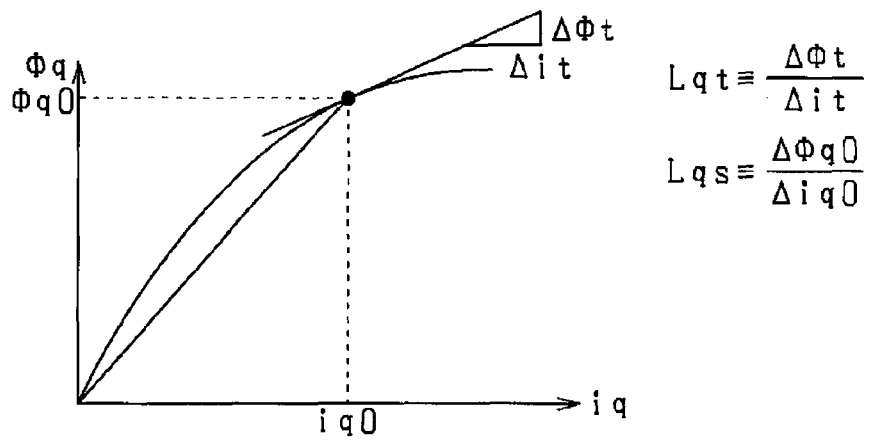
FIG. 3 is a diagram showing schematically a transient-state inductance.
FIG. 4 is a diagram showing a method of setting a steady-state inductance and a transient-state inductance in the first embodiment.

Here, the transient-state inductances Ldt and Lqt become smaller than the steady-state inductances Lds and Lqs. This is because, as shown in FIG. 3, the increase speed of the flux linkage relative to the current increase decreases as a result of magnetic saturation, which occurs as the current increases. In FIG. 3, it is shown that the increase speed of the flux linkage $\Phi q$ of the q-axis decreases as the current of the q-axis increases. For this reason, the steady-state inductance Lqs, which is a ratio between a current value iq0 having a large absolute value and a corresponding flux linkage $\Phi q0$, becomes larger than the transient-state inductance Lqt, which is a change speed of the flux linkage relative to the current corresponding to the current value iq0.

The transient-state inductances Ldt, Lqt and the steady-state inductances Lds, Lqs are variably set in accordance with the demand torque T*. The demand torque T* is a parameter, which is correlated to the current flowing in the motor/motor/generator 10. Since the command currents id*, iq* are determined based on the demand torque T*, the demand torque T* is a parameter, which accurately indicate each of the d-axis current and the q-axis current actually flowing in the motor/generator 10.

Specifically, the above-described variable setting processing is performed by using a data map, which defines a relation among the transient-state inductances Ldt, Lqt, the steady-state inductances Lds, Lqs and the demand torque T*. FIG. 4 shows a data map related to the inductance of the q-axis. The steady-state inductance Lqs and the transient-state inductance Lqt are set to be smaller as the demand torque T* is larger. This is for the reason that the increase of flux linkage decreases due to the current increases due to the increase of torque. The transient-state inductance Lqt is set equal to the steady-state inductance Lqs in a range, in which the demand torque T* is small.

Figure 5:
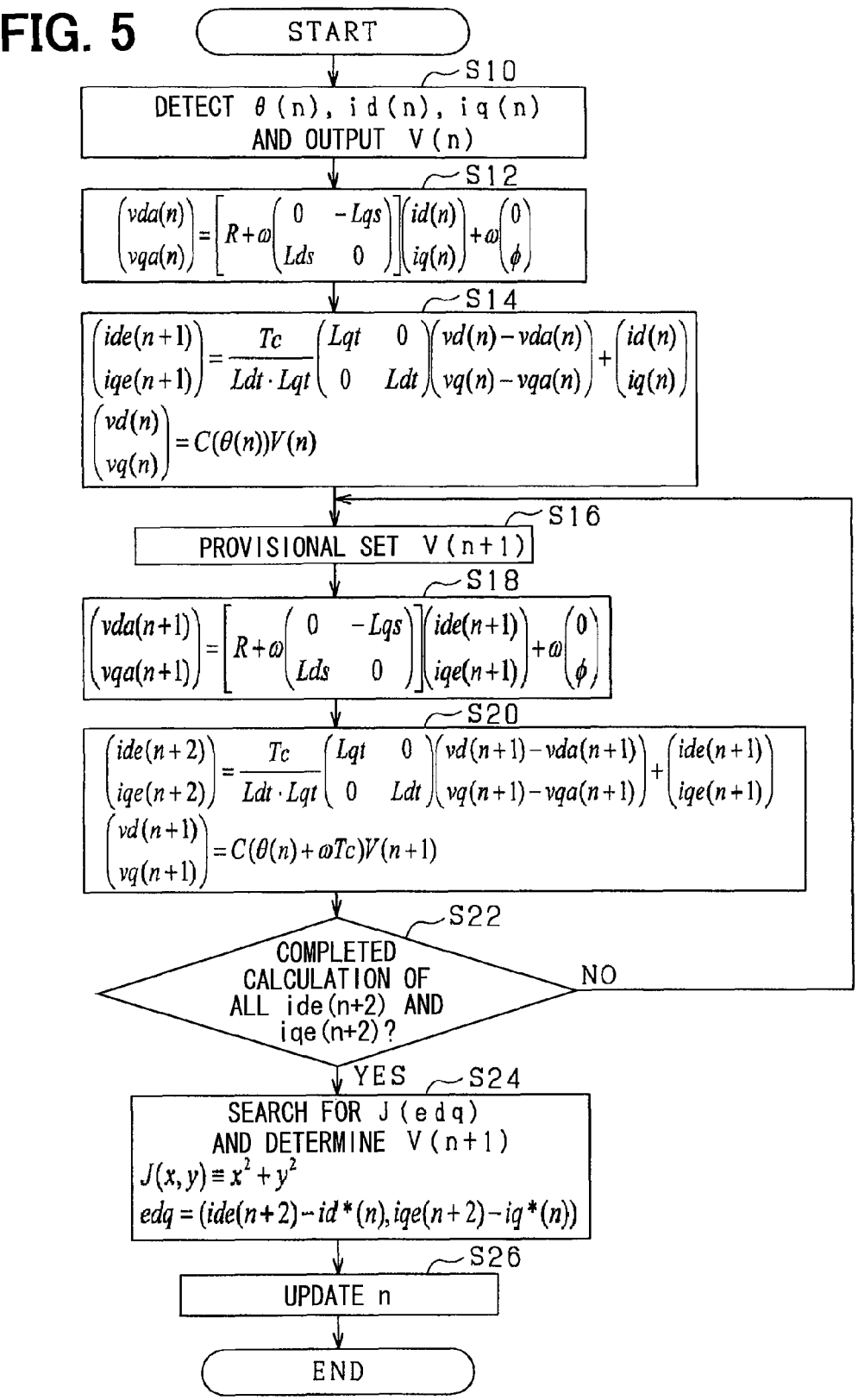
FIG. 5 is a flowchart showing processing of model estimation control according to the first embodiment.

FIG. 5 shows processing of the model estimation control. This processing is repeated at every predetermined interval (control cycle period Tc).

In this series of processing, at step S10, an electric angle θ(n) and actual currents id(n), iq(n) are detected. A voltage vector V(n) determined in the preceding control cycle period is outputted. That is, the switching mode of the inverter 11 is updated to a switching mode (switching mode corresponding to the voltage vector V(n)) determined in the preceding control cycle period.

At the following step S12, an average voltage vector (vda(n), vqa(n)), which is an average output voltage vector of the inverter 11 is calculated, and thus implements an average voltage calculation section. This can be calculated by the following equations (c8) and (c9), which are provided by eliminating the terms of the transient-state inductances Ldt, Lqt from the equations (c1) and (c2) and by substituting the actual current id(n), ig(n) into such equations.

$$vda = R \cdot id - \omega \cdot Lqs \cdot iq \tag{c8}$$

$$vqa = R \cdot iq + \omega \cdot id + \omega \cdot \phi \tag{c9}$$

At the next step S14, the current (ide(n+1), iqe(n+1)) is estimated as an actual current, which is one control cycle period ahead. This is also processing of estimation of the current, which is one control cycle period ahead, based on the voltage vector V(n) outputted at step S10. This estimation may be performed by the following equations (c10) and (c11), which are derived by dividing the voltage vector (vd, vq) of the above-described equations (c1) and (c2) into the average voltage vector (vda, vqa) and an instantaneous voltage vector (vd−vda, vq−vqa), and setting the instantaneous voltage vector (vd−vda, vq−vqa) to be equal to the terms of the transient-state inductances of the equations (c1) and (c2)—thereby implementing instantaneous voltage calculation section.

$$vd - vda = Ldt \cdot (did/dt) \tag{c10}$$

$$vq - vqa = Lqt \cdot (diq/dt) \tag{c11}$$

More specifically, it is estimated by the following equations (c12) and (c13), which are derived by discretizing the equations (c10) and (c11) by the control cycle period Tc.

$$ide(n+1)=Tc\cdot\{vd(n)-vda(n)\}/Ldt+id(n) \quad (c12)$$

$$iqe(n+1)=Tc\cdot\{vq(n)-vqa(n)\}/Lqt+iq(n) \quad (c13)$$

The voltage vector (vd(n), Vq(n)) is calculated as the voltage components of the d-axis and the q-axes by transforming the voltage vector V(n) outputted at step S10 by a transform matrix by the electric angle θ(n) detected at step S10.

At subsequent steps S16 to S22, another estimation processing is performed to estimate the current, which is two control cycle period ahead. This is performed for each of switching modes (voltage vector V(n+1)), which is provisionally set for the next control cycle period. That is, first at step S16, the voltage vector V(n+1) is set provisionally. At the next step S18, an average voltage vector (vda(n+1), vqa(n+1)) is calculated by using the estimated currents ide(n+1), iqe(n+1) in place of actual currents id(n), iq(n) in the similar manner as the step S12. At step S20, similarly to step S14, estimated currents ide(n+2), iqe(n+2), which are for two control cycle period ahead. Here, the estimated currents ide (n+1), iqe(n+1) are used in place of the actual currents id(n), iq(n), and instantaneous voltage vector (vd(n+1)−vda(n+1), vq(n+1)−vqa(n+1)) is used. The voltage vector (vd(n+1), Vq(n+1)) is calculated as the voltage components on the d-q-axes by transforming the voltage vector V(n+1) provisionally set at step S16 by a transform matrix by a rotation angle, which corresponds to a sum of the electric angle θ(n) and ω·Tc.

At step S22, it is checked whether the estimated currents ide(n+2), iqe(n+2) are calculated with respect to each of the switching modes 0 to 7. If the check result at step S22 is NO, step S16 is executed again. If the check result at step S22 is YES, step S24 is executed.

At step S24 implementing a change amount estimation section), the switching mode (voltage vector V(n+1)) of the next control cycle period is determined. Here, one of the switching modes, which has the highest point in evaluation by an evaluation function J, is determined to be the switching mode (voltage vector V(n+1)). The switching modes are evaluated by using the evaluation function J, which lowers the evaluation result as the difference of each component between the command current vector and the estimated current vector increases. Specifically, the evaluation function J outputs higher points as the evaluation result lowers. More specifically, the evaluation function J is calculated based on an inner product value of a difference between the command current vector (id*, iq*) and the estimated current vector (ide, iqe). The difference between each component of the command current vector and the estimated current vector becomes positive and negative. Therefore, this is one method of expressing that the evaluation becomes lower as the value increases.

At time step S22 outputs a YES result, the estimated currents ide(n+2), iqe(n+2) are calculated with respect to each of the switching modes 0 to 7. For this reason, eight evaluation values of the evaluation function J can be calculated by using eight kinds of estimated currents ide(n+2), iqe(n+2).

At the following step S26, by decrementing each time a parameter n, which designates a sampling number of the voltage vector, the current and the electric angle, the parameter n is updated thereby finishing one cycle of the above-described processing.

The first embodiment provides the advantage in operation as shown in FIGS. 6A to 6D through FIGS. 10A to 10D. FIGS. 6A to 6D through FIGS. 10A through 10D show operation data in a high torque range, in which the ratio between the current flowing in the motor/generator 10 and the flux linkage remarkably differs from that of a low torque range. In this high torque range, the magnetic saturation occurs remarkably.

FIGS. 6A, 7A, 8A and 9A show current changes relative to electric angles, which are produced in different inductances and various rotation speeds. FIGS. 6B, 7B, 8B and 9B show enlarged illustration of current changes identified by dotted rectangles in FIGS. 6A, 7A, 8A and 9A, respectively. FIGS. 6C, 7C, 8C, 9C and FIGS. 6D, 7D, 8D, 9D show trajectories of current errors.

Figure 6A:
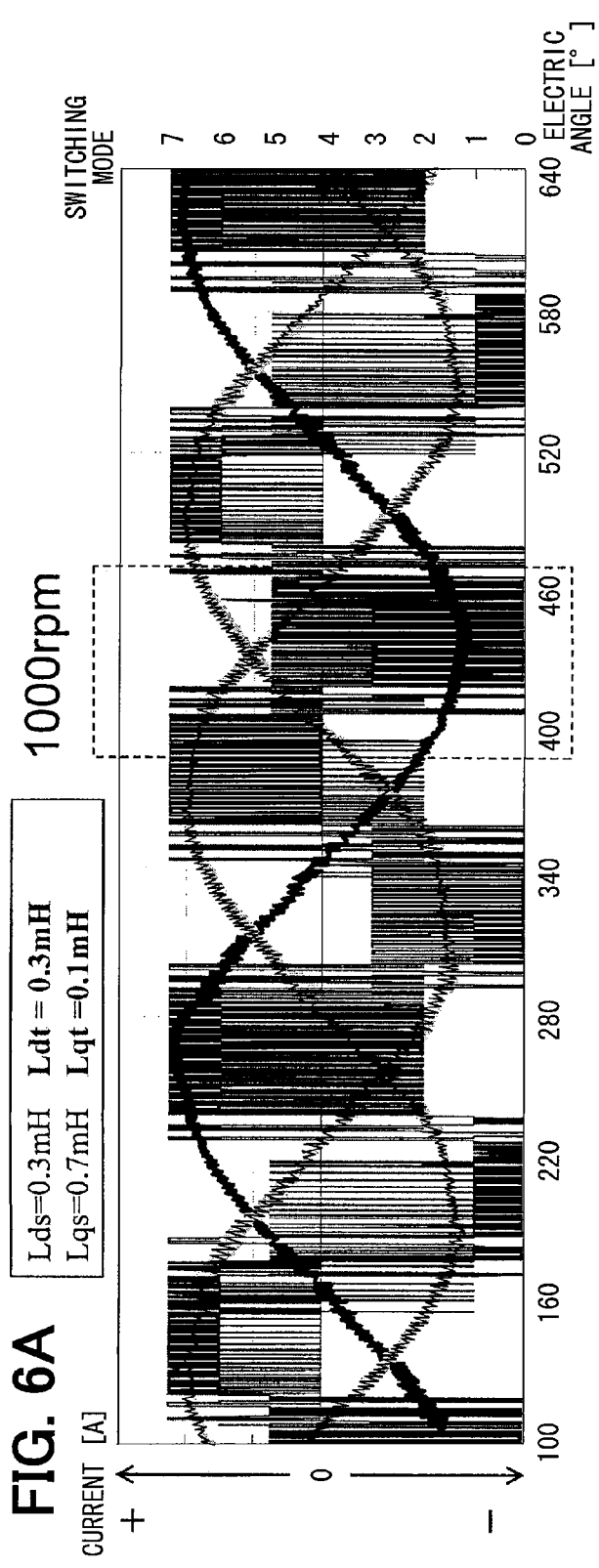
FIGS. 6A, 6B, 6C and 6D are charts and graphs showing one example of operation result of the first embodiment.
Figure 6D:
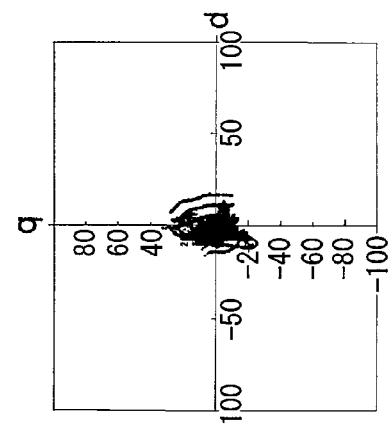
Figure 6C:
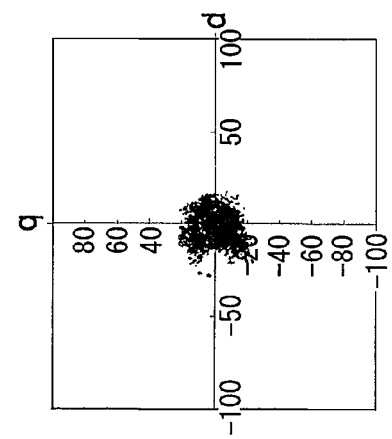
Figure 6B:
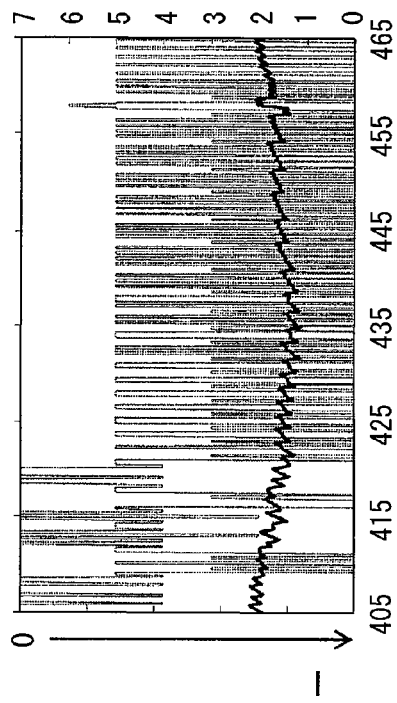
Figure 7A:
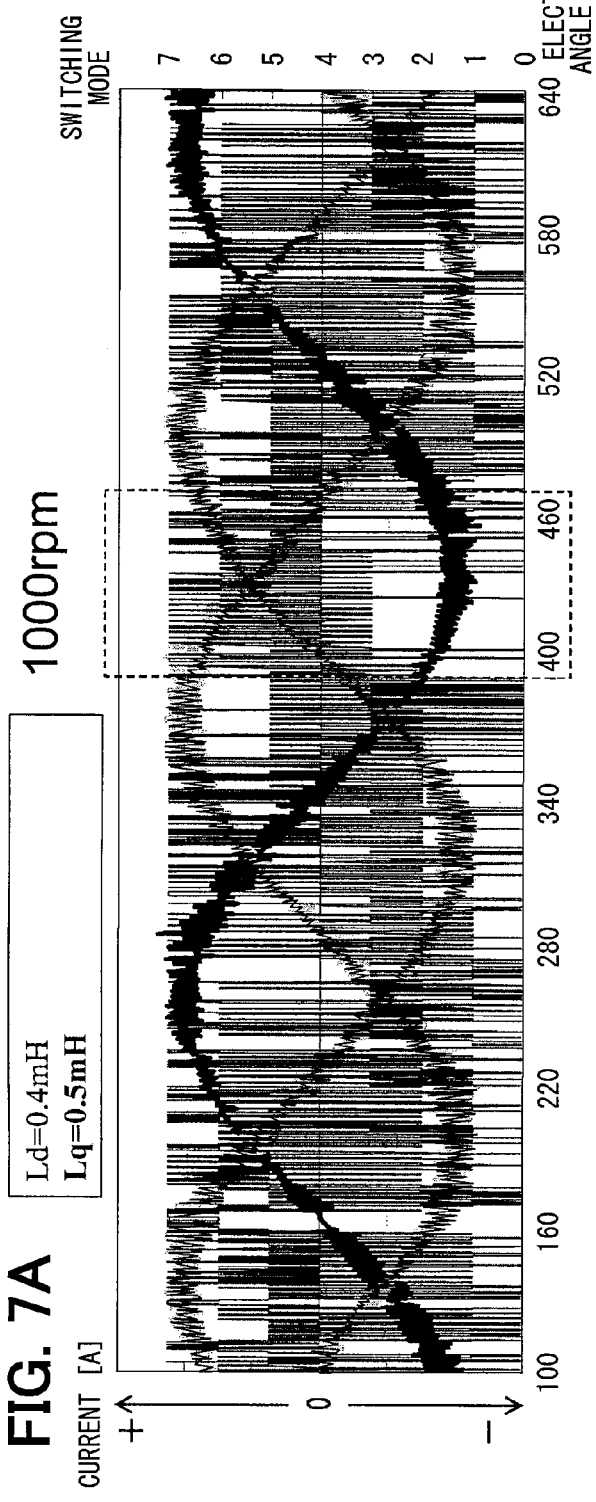
FIGS. 7A, 7B, 7C and 7D are charts and graphs showing another example of operation result of the first embodiment.
Figure 7B:
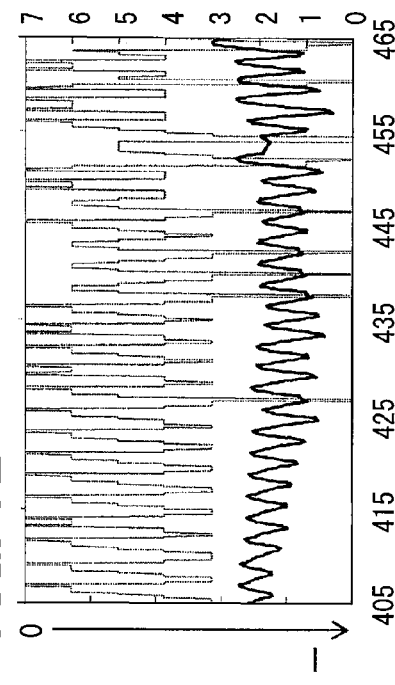
Figure 7C:
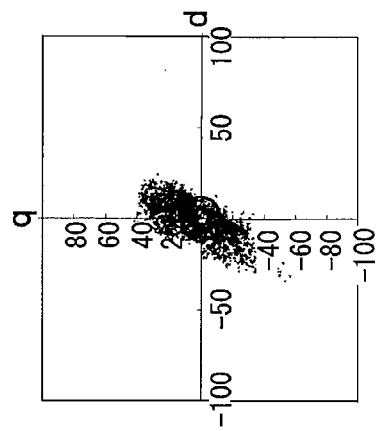
Figure 7D:
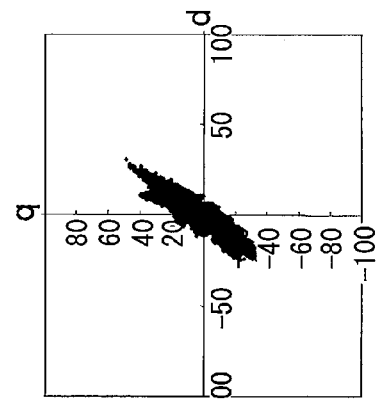
Figure 8A:
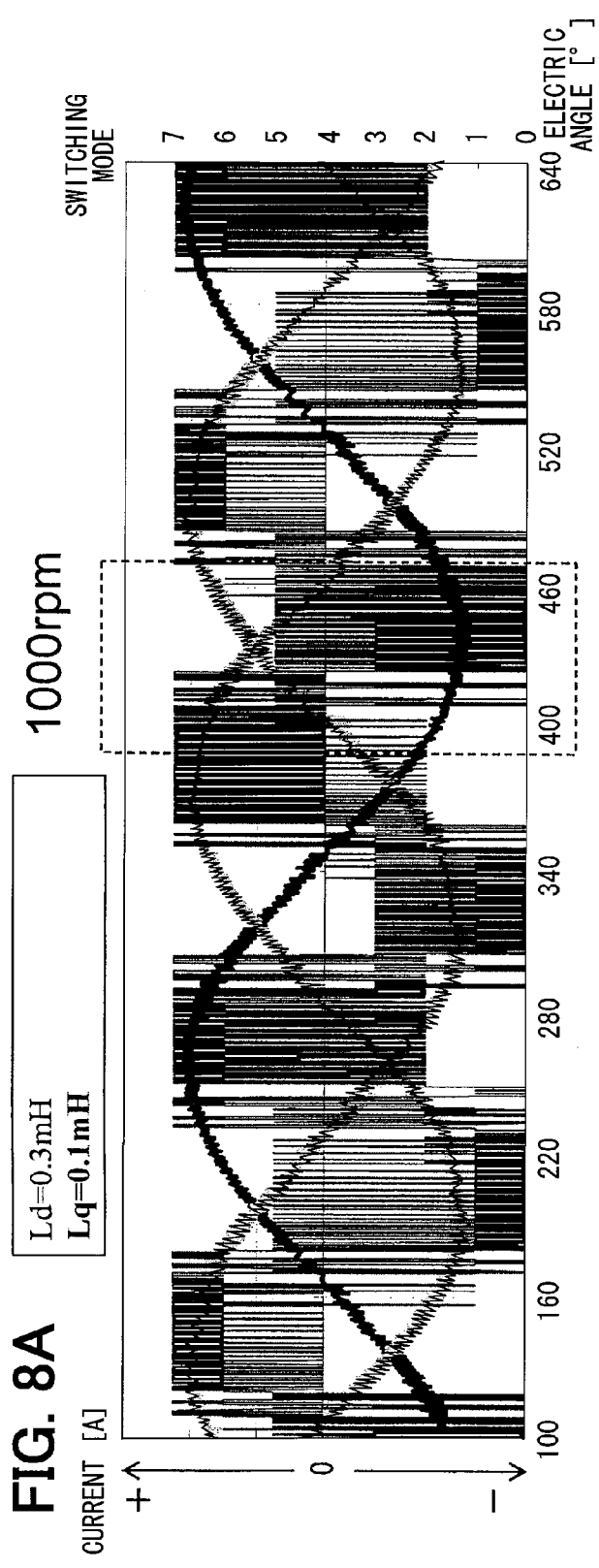
FIGS. 8A, 8B, 8C and 8D are charts and graphs showing a further example of operation result of the first embodiment.
Figure 8B:
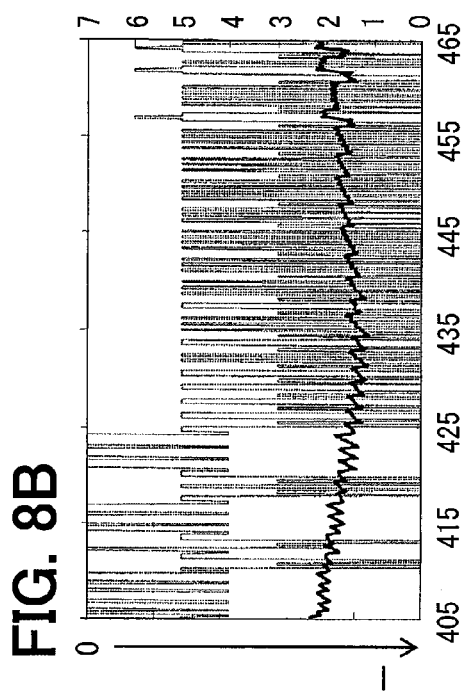
Figure 8C:
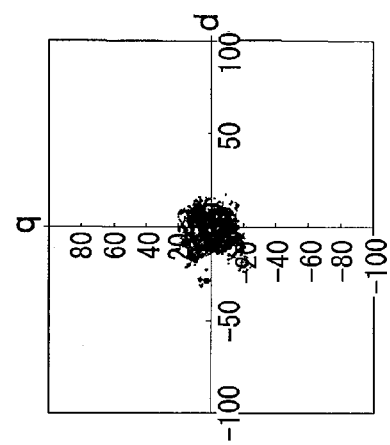
Figure 8D:
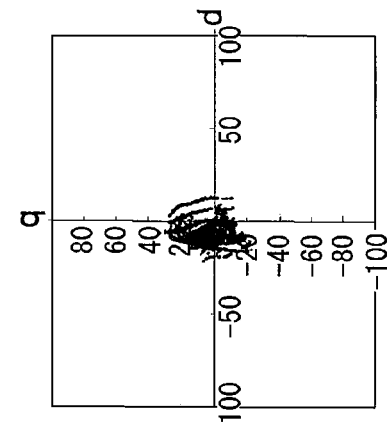
Figure 9A:
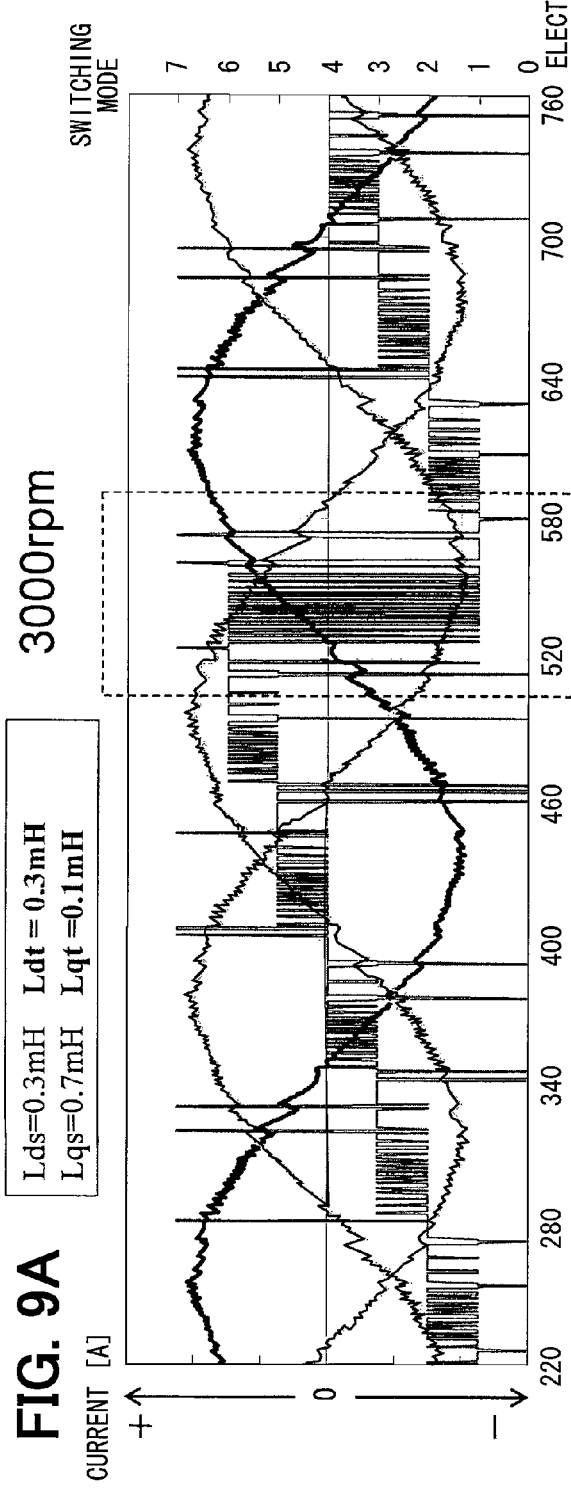
FIGS. 9A, 9B, 9C and 9D are charts and graphs showing a further example of operation result of the first embodiment.
Figure 9D:
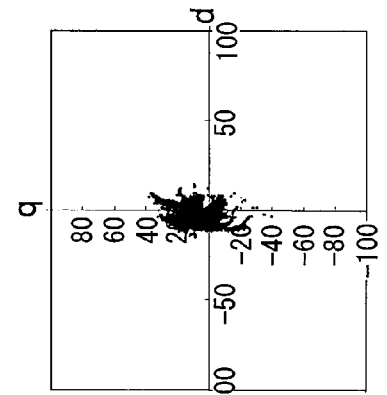
Figure 9C:
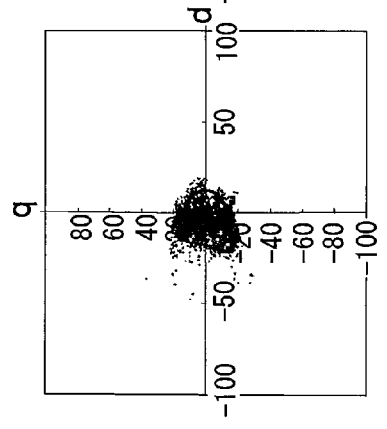
Figure 9B:
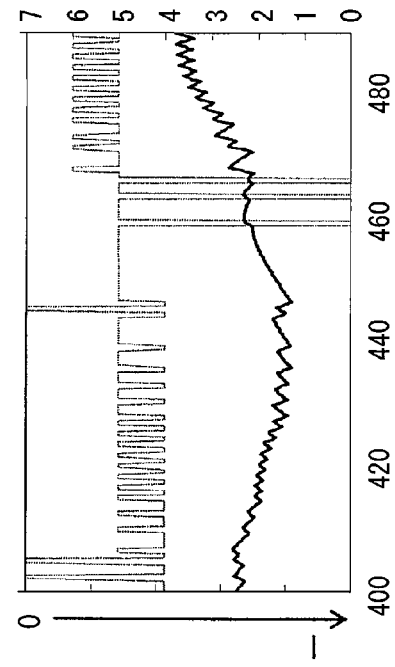

FIGS. 6A to 6D shows an operation result of a case described above. As shown in FIGS. 6C and 6D, the distribution of errors between the command currents id*, iq* and the actual currents id, iq (FIG. 6C) as well as the distribution of errors between the estimated currents ide, iqe and the actual currents id, iq (FIG. 6D) are located locally within a small area. For this reason, it is considered that the estimated currents ide, iqe are calculated accurately.

On the contrary, FIGS. 7A to 7D show a case, in which the model estimation control is performed by using the following equations (c14) and (c15).

$$vd=R\cdot id+Ld\cdot(did/dt)-\omega\cdot Lq\cdot iq \quad (c14)$$

$$vq=R\cdot iq+Lq\cdot(diq/dt)-\omega\cdot Ld\cdot id+\omega\cdot\phi \quad (c15)$$

In this case, the control performance is degraded. That is, the distribution of errors between the command currents id*, iq* and the actual currents id, iq (FIG. 7C) as well as the distribution of errors between estimated current ide, iqe (FIG. 7D) are widened relative to the case of FIGS. 6C and 6D.

FIGS. 8A to 8D show a case, in which the model estimation control is performed based on the equations (c14) and (c15) with the d-axis inductance Ld and the q-axis inductance Lq are set to be generally equal to the transient-state inductances Ldt and the Lqt. As a result, the distribution of errors between the command currents id*, iq* and the actual currents id, iq (FIG. 8C) as well as the distribution of errors between the estimated currents ide, iqe and the actual currents id, iq (FIG. 8D) are narrowed. This does not mean that the result shown in FIGS. 7A to 7D is nothing but an error, which is caused by in appropriate setting of the d-axis inductance Ld and the q-axis inductance Lq.

FIGS. 9A to 9D as well as FIGS. 10A to 10D explain this situation. FIGS. 9A to 9D as well as FIGS. 10A to 10D both show cases, in which the rotation speeds are increased under the same torque (current) and the same inductance as in the cases of FIGS. 6A to 6D as well as FIGS. 8A to 8D. According to the case of FIGS. 9A to 9D, the distribution of errors between the command currents id*, iq* and the actual id, iq (FIG. 9C) as well as the distribution of errors between the estimated currents ide, iqe and the actual currents id, iq (FIG. 9D) are limited to be within a small range. However, in the case of FIGS. 10A to 10D, in which the inductances are set to be equal to those in the case of FIGS. 8A to 8D, the distribution of errors between the command currents id*, iq* and the actual currents ide, iqe (FIG. 10C) as well as the distribution of errors between the estimated currents ide, iqe and the actual currents id, iq (FIG. 10D) are widened. Thus control performance is degraded.

That is, according to the model estimation control, which uses the equations (c14) and (c15), it is not possible to uniquely determine the inductance, which estimates the current accurately, in the range where the magnetic saturation becomes remarkable. This is because the equations (c14) and (c15) cannot express appropriately that the ratio between the flux linkage and the current changes as described with reference to FIG. 3. This problem does not arise when the conventional triangular wave PWM processing is used. Because the command voltages vd*, vq*, which are target operation amounts in the feedback control in the triangular wave PWM processing, correspond to the average vector (vda, vqa) of the first embodiment. Since the inductances in the equations (c14) and (c15) change in correspondence to the torque and the current, the control performance can be maintained by changing the feedback gain and the like. This means that, according to the first embodiment, the average voltages vda, vqa can be calculated accurately by variably setting the steady-state inductances Lds, Lqs based on the data map shown in FIG. 4.

The model estimation control is different from the conventional triangular wave PWM control in that the accuracy of calculation of the change amount in the control amount (current) corresponding to the instantaneous voltage directly influences the control performance in the model estimation control. It is this point that the transient-state inductances Ldt, Lqt are required to be defined in addition to the steady-state inductances Lds, Lqs by using the equations (c6) and (c7). It is to be noted here that the equations (c6) and (c7), which are usable in defining the transient-state inductances Ldt, Lqt in addition to the steady-state inductances Lds, Lqs, are different from the equations, which are derived by defining $\Phi d = Ld \cdot id + \phi$ and $\Phi q = Lq \cdot iq$ in the above-described equations (c14) and (c15). It is because that the above-described equations (c6) and (c7) are derived by defining the inductance of each phase to be $Lu = 1 + L\cos 2\theta$ in the three-phase voltage equations as described in, for example, "Design and Control of Interior Magnet Synchronous Motor" authored by Takeda et al and published by Ohm Company. The equations (c6) and (c7) are not directed to the models, which presume that the inductances vary with the currents.

The above-described equations (c1) and (c2), which are used in the model estimation control according to the first embodiment, are not derived by modifying or correcting the equations (c14) and (c15) used in the conventional model estimation control. The model estimation control using the above-described equations (c1) and (c2) according to the first embodiment is configured by fully remodeling the model equations based on a fining that it is not possible to improve the control performance by varying the inductances and the like in various ways in the model estimation control, which uses the above-described equations (c14) and (c15).

According to the first embodiment, the following advantages will be provided.

(1) The transient-state inductances Ldt, Lqt are used to calculate the change amount in the current based on the instantaneous voltage vector (vd−vda, vq−vqa) outputted by the inverter 11. Thus, it is possible to improve the accuracy of estimation of the current and hence the control performance of the model estimation control even in the range where the magnetic saturation occurs remarkably.

(2) The transient-state inductances Ldt, Lqt are set to be smaller than the ratio of the flux linkage relative to the current flowing in the motor/generator 10. As a result, the current differentiation value of the flux linkage can be expressed with high accuracy.

(3) The transient-state inductances Ldt, Lqt are variably set in accordance with the current flowing in the motor/generator 10. As a result, the inductance values, which express the current differentiation value of the flux linkage with high accuracy, can be derived.

(4) The average voltage vector (vda, vqa) is calculated by using the steady-state inductances Lds and Lqs. As a result, the average voltage vector (vda, vqa) can be calculated appropriately.

(5) The steady-state inductances Lds, Lqs are variably set in accordance with the current flowing in the motor/generator 10. As a result, the inductance values, which express the relation between the current and the flux linkage with higher accuracy, can be derived.

(Second Embodiment)

A second embodiment will be described below about a difference from the first embodiment.

According to the second embodiment, the steady-state inductances Lds, Lqs and transient-state inductances Ldt, Lqt are variably set in accordance with not only the demand torque T* but also the electric angle $\theta$. Specifically, the steady-state inductances Lds, Lqs and the transient-state inductances Ldt, Lqt are variably set at an interval of 1/6 times of the electric angle $\theta$. This is because the sixth harmonic component is particularly remarkable as spatial higher harmonic components, which contribute to torque ripple of the motor/generator 10.

Figure 11:
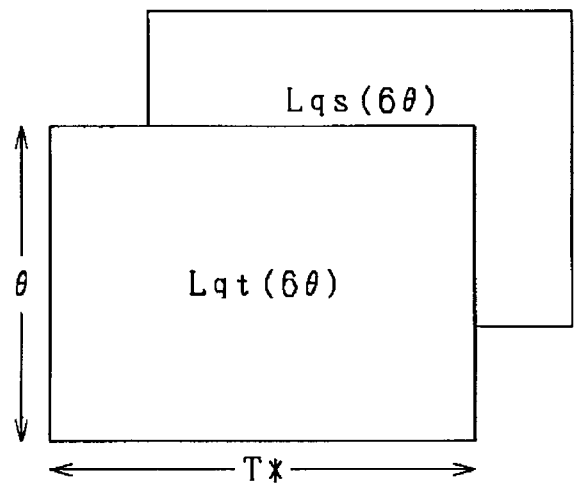
FIG. 11 is a diagram showing a method of setting a steady-state inductance and a transient-state inductance in a second embodiment of a control system of a rotary machine.

Specifically, as exemplified with respect to the q-axis component in FIG. 11, a plurality of maps is used to define the relation between the demand torque T* and the electric angle $\theta$ with respect to each of the steady-state inductances Lds, Lqs and each of the transient-state inductances Ldt, Lqt.

(Third Embodiment)

A third embodiment will be described below about a difference from the first embodiment.

Figure 12:
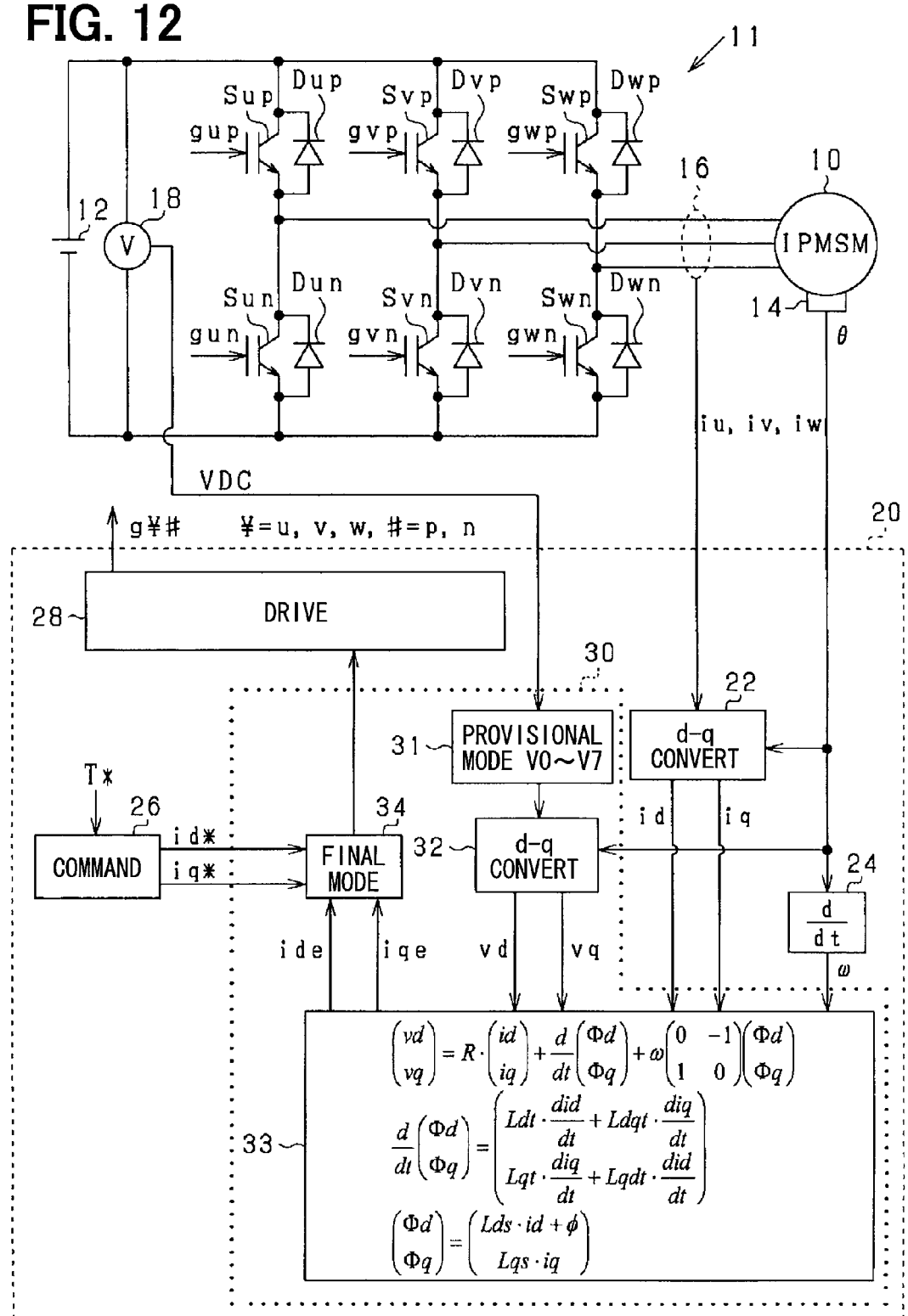
FIG. 12 is a system diagram showing a third embodiment of a control system for a rotary machine.

FIG. 12 shows a system configuration according to the third embodiment. In FIG. 12, the same processing and structural parts as shown in FIG. 1 are designated by the same reference numerals for simplicity.

In the figure, as indicated in the estimation section 33, cross-coupling inductances Ldqt, Lqdt are introduced as the transient-state inductances. According to the third embodiment, the following equations (c16) and (c17) are used in place of the above-described equations (c1) and (c2).

$$vd = R \cdot id - \omega \cdot Lqs \cdot iq + Ldt \cdot (did/dt) + Ldqt \cdot (diq/dt) \qquad (c16)$$

$$vq = R \cdot iq + \omega \cdot Lds \cdot id + \omega \cdot \phi + Lqt \cdot (diq/dt) + Lqdt \cdot (did/dt) \qquad (c17)$$

This is because, as the magnetic saturation becomes remarkable, the d-axis actual current id influences the q-axis flux linkage $\Phi q$ and the q-axis actual current iq influences the d-axis flux linkage $\Phi d$. The cross-coupling inductances Ldqt and Lqdt are defined as a coefficient of partial differentiation of the flux linkage $\Phi d$ by the actual current iq and a coefficient of partial differentiation of the flux linkage $\Phi q$ by the actual current id in the terms of the time differentiations of the flux linkages $\Phi d$ and $\Phi q$ in the equations (c6) and (c7), respectively.

Figure 13:
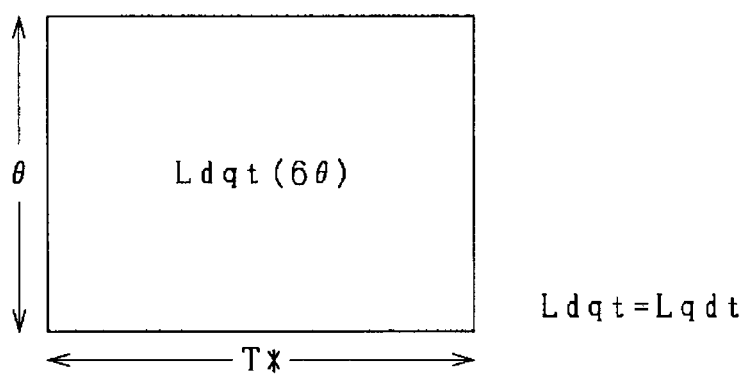
FIG. 13 is a diagram showing a method of setting a transient-state inductance in the third embodiment.

Specifically, the cross-coupling inductances Ldqt is variably set in accordance with the demand torque T* and the electric angle $\theta$. The demand torque T* is a parameter that represents the d-axis current and the q-axis current flowing in the motor/generator 10. The electric angle $\theta$ is a parameter for considering the sixth higher harmonic component caused by the spatial higher harmonic. Specifically, as shown in FIG. 13, a data map is used to define the relation among the demand torque T*, the electric angle $\theta$ and the cross-coupling inductance Ldqt. The inductance Ldqt is assumed to be equal to Lqdt based on analytical and experimental finding that the influence of the d-axis current change of the q-axis flux linkage and the influence of the q-axis current change of the d-axis flux linkage are generally the same.

According to the third embodiment, the cross-coupling inductances Ldqt, Lqdt are assumed to be 0 in the small current range, in which the demand torque T* is smaller than a threshold torque Tth. This is based on the finding that, in the range in which the magnetic saturation does not become remarkable, the influence of the d-axis actual current id on the flux linkage Φq and the influence of the q-axis actual current iq on the flux linkage Φd are not remarkable.

(Fourth Embodiment)

A fourth embodiment will be described below about a difference from the third embodiment.

Figure 14:
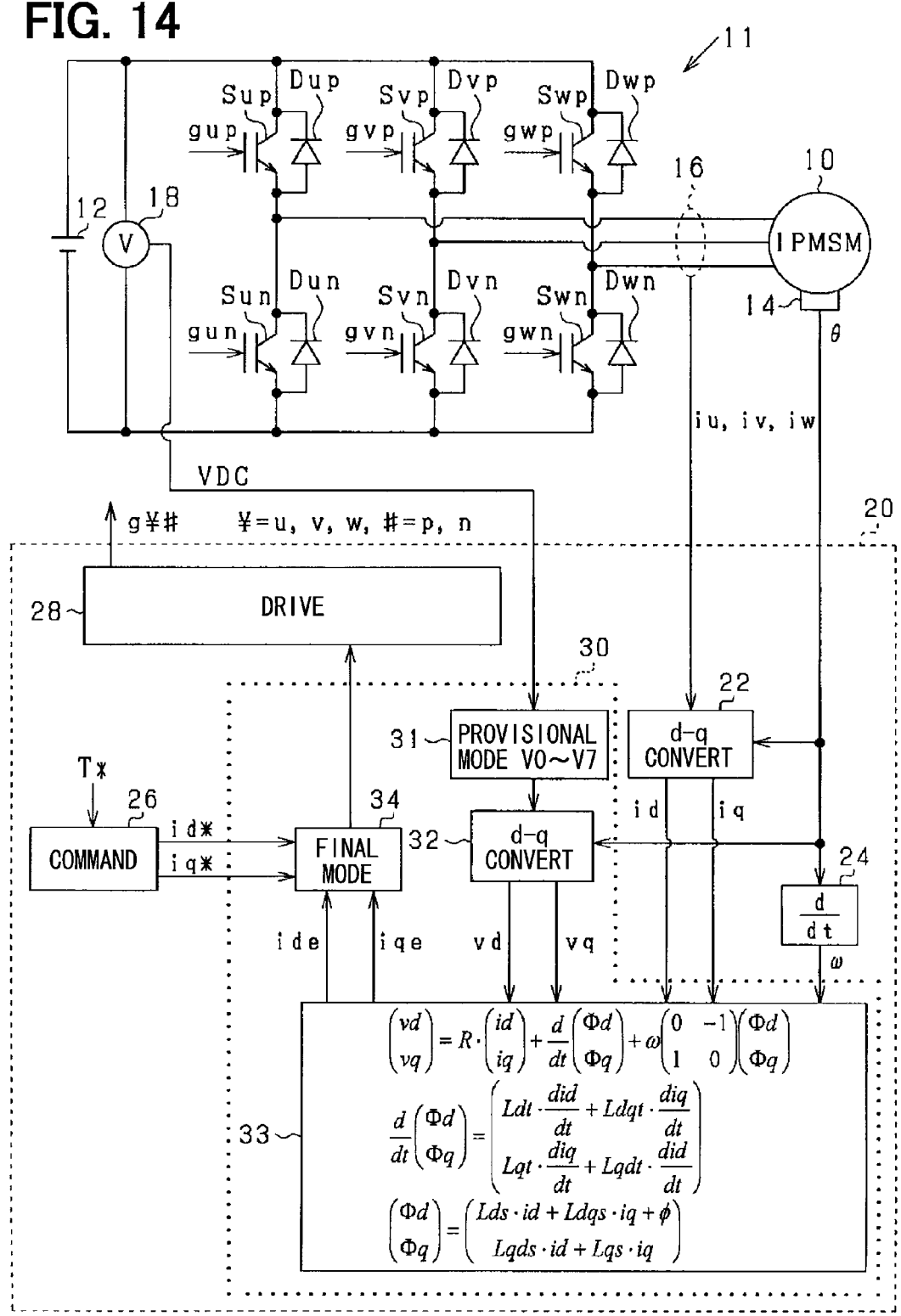
FIG. 14 is a system diagram showing a fourth embodiment of a control system for a rotary machine.

FIG. 14 shows a system configuration according to the fourth embodiment. In FIG. 14, the same processing and parts as shown in FIG. 1 are designated by the same reference numerals for simplicity.

In FIG. 14, as indicated in the estimation section 33, cross-coupling inductances Ldqs, Lqds are introduced as the steady-state inductances. According to the third embodiment, the following equations (c18) and (c19) are used in place of the above-described equations (c16) and (c17).

$$vd = Rid - \omega \cdot Lqs \cdot iq - \omega \cdot Lqds \cdot id + Ldt \cdot (did/dt) + Ldqt \cdot (did/dt) \quad (c18)$$

$$vq = R \cdot iq + \omega \cdot Lds \cdot id + \omega \cdot Ldqs \cdot iq \cdot \omega \cdot \phi + Lqt \cdot (diq/dt) + Lqdt \cdot (diq/dt) \quad (c19)$$

This is because, as the magnetic saturation becomes remarkable, the d-axis actual current id influences the q-axis flux linkage Φq and the q-axis actual current iq influences the d-axis flux linkage Φd. The terms of the cross-coupling inductances Ldqs and Lqds are derived by assuming that the flux linkage Φd is in a proportional relation with the actual current iq and the flux linkage Φq is in a proportional relation with the actual current id in the terms of the flux linkages Φd and Φq in the equations (c6) and (c7), respectively.

Figure 15:
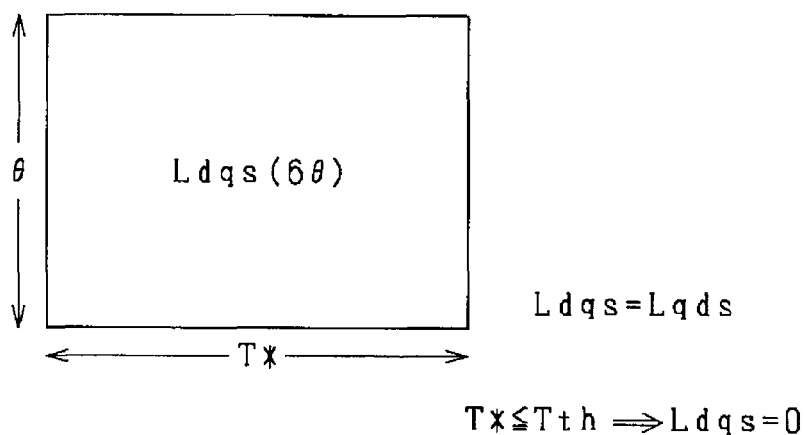
FIG. 15 is a diagram showing a method of setting a steady-state inductance in the fourth embodiment.

Specifically, the cross-coupling inductances Ldqs is variably set in accordance with the demand torque T* and the electric angle θ. The demand torque T* is a parameter that represents the d-axis current and the q-axis current flowing in the motor/generator 10. The electric angle θ is a parameter for considering the sixth higher harmonic component caused by the spatial higher harmonic. Specifically, as shown in FIG. 15, a data map is used to define the relation among the demand torque T*, the electric angle θ and the cross-coupling inductance Ldqs. According to the fourth embodiment, Ldqt is assumed to be equal to Lqdt.

According to the fourth embodiment, the cross-coupling inductances Ldqs, Lqds are assumed to be 0 in the small current range, in which the demand torque T* is smaller than a threshold torque Tth. This is based on the finding that, in the range in which the magnetic saturation does not become remarkable, the influence of the d-axis actual current id on the flux linkage Φq and the influence of the q-axis actual current iq of the d-axis flux linkage Φd are not remarkable.

(Other Embodiments)

The above-described embodiments may be modified as follows.

[Transient-State Inductance]

Although the transient-state inductances Ldt, Lqt are assumed to be equal to the steady-state inductances Lds, Lqs in the low torque range in the first embodiment, the transient-state inductances may be different from the steady-state inductances.

An input parameter for variably setting in accordance with the current is not limited to the demand torque T* but may be an estimated torque estimated from the current. The current may be used as a direct input parameter in place of the torque.

It is possible to variably set the transient-state inductance Ldt not based on the actual current iq but based on the actual current id or variably set the transient-state inductance Lqt not based on the actual current id but based on the actual current iq. It is further possible to variably set the transient-state inductances based on both of the actual currents.

For the variable setting based on the electric angle θ, the parameter is not limited to a parameter which changes at the interval of one-sixth of the electric angle, but may be a parameter causing a variation at the same order as the spatial higher harmonic other than the sixth order, which becomes remarkable according to the configuration of the motor/generator 10.

[Steady-State Inductance]

The input parameter for variably setting the steady-state inductance is not limited to the demand torque T* but may be an estimated torque estimated from the current. The current may be used as a direct input parameter in place of the torque.

[Cross-Coupling Inductance]

The input parameter for variably setting the current is not limited to the demand torque T* but may be an estimated torque estimated from the current. The current may be used as a direct input parameter in place of the torque.

As the parameter for variably setting in accordance with the electric angle θ, the parameter is not limited to a parameter which changes at the interval of one-sixth of the electric angle, but may be a parameter causing a variation at the same order as the spatial higher harmonic other than the sixth order, which becomes remarkable according to the configuration of the motor/generator 10.

The inductances need not satisfy Ldqt=Lqdt and Ldqs=Lqds. In a case that the influence of the d-axis current of the q-axis flux linkage and the influence of the q-axis current of the d-axis flux linkage differ from each other, these values may be set to be different from each other. Further in a case that one of the values is smaller, such a small value may be approximated to 0.

[Inductance Information]

The control apparatus 20 need not store therein the inductance values as a calculation parameter. For example, a relation between the instantaneous voltage vector (vd−vda, vq−vqa) and the instantaneous current (ide(n+2)−ide(n+1), iqe(n+2)−iqe(n+1)) may be stored, and the instantaneous current in this data map may be determined based on the transient-state inductances Ldt, Lqt. In this case it is preferred to include the demand torque T* and the like as the input parameters of the data map.

[Average Voltage Calculation Section]

The average voltage calculation section is not limited to a section, which uses the steady-state inductance. For example, the average value of the voltage vector corresponding to the actual switching mode of the inverter 11 may be used as the average voltage. The average voltage thus calculated may be calculated as the vector norm of the average voltage, and the phase of the average voltage may be calculated based on a difference between the actual current and the command current may be calculated based on a direction of change in a difference between the actual current and the command current in the switching modes 0 and 7 corresponding to the zero voltage vector.

The vector itself of the average voltage may be calculated from changes in the current. This is possible by setting the estimated currents ide(n+1), iqe(n+1) as the actual currents in the equations (c12) and (c13) and by using the relation that the average voltage vector (vda, vqa) is expressed by the change amount of the actual current and the instantaneous voltage in view of the transient-state inductances.

[Change Amount Calculation Section]

This calculation section is not limited to calculation of the change amount of current. For example, a change amount of torque may be calculated. In consideration that the torque T is expressed as T=P·iq+(Lq−Ld)·id·iq, the change amount of torque is expressed as ΔT=P·Δiq+(Lq−Ld)·Δid·Δiq by using the instantaneous current vectors (Δid, Δiq)=(ide(n+2)−ide(n+1), iqe(n+2)−iqe(n+1)).

[Coordinate System for Estimation Processing]

The coordinate system is not limited to the d-q coordinate system but may be a three-phase coordinate system. Even in this case, it is advantageous to define the transient-state inductance as the current differentiation value of the flux linkage for defining the relation between the instantaneous voltage and the instantaneous current highly accurately.

[Provisionally Set Switching Mode]

The switching modes are not limited to all modes but may be other modes, in which the number of switch-over terminals in the switching operation is 1 or less, or 2 or less.

[Estimation Section]

The estimation section is not limited to a section, which estimates only the control amount caused by the voltage vector V(n+1) corresponding to the next switching mode. For example, it may estimate a plurality of control amounts of the inverter 11 in sequence up to an update timing, which is ahead of a number of control cycle periods.

[Determination Section]

It is possible in the first embodiment to calculate a weighted average value of an absolute value of a difference between the estimated current ide(n+2) and the command value id*(n+2) and an absolute value of a difference between the estimated current iqe(n+2) and the command current iq*(n+2), and use it as a parameter to be evaluated as a difference between the estimated current and the command current. It is only necessary to quantize the difference by a parameter, which has a positive or a negative relation between the difference and the evaluation parameter thereby to quantize that the evaluation becomes lower as the difference becomes larger.

[Control Amount]

The control amount used to determine the switching mode of the inverter 11 based on the command value and the estimated value is not limited to the current. The control amount may be the torque and the flux linkage, only the torque or only the flux linkage, for example. The control amount may be the torque and the d-axis current, the torque and the q-axis current, or the torque and the current, for example. In case that the control amount is other than the current, the sensor may directly detect a parameter which is not the current.

In each of the above-described embodiments, the final control amount of the rotary machine (whether it is the subject of estimation, it is required to be the final amount) is assumed to be the torque. However, it is not limited to the torque but may be a rotation speed, for example.

[Rotary Machine]

The rotary machine is not limited to the three-phase rotary machine but may be a rotary machine of four or more phases such as a five-phase rotary machine.

In the above-described embodiments, stator windings are assumed to be star-connected. However the stator windings may be delta-connected. In this case, the terminals and the phases of the rotary machine do not match.

The rotary machine is not limited to the interior magnet synchronous machine, but may be a surface magnet synchronous machine, a field winding synchronous machine or other synchronous machine. Further, it is not limited to the synchronous machine but may be an induction rotary machine such as an induction motor.

The rotary machine need not be used as the main machine of a vehicle.

[Others]

The DC power supply source is not limited to the high voltage battery 12 but may be, for example, an output terminal of a converter for boosting a voltage of the high voltage battery 12.

The power conversion circuit formed of switching devices for turning on and off connection between voltage application sections for applying voltages of different voltage values and terminals of the rotary machine is not limited to a DC-AC conversion circuit (inverter 11) including switching devices, which selectively connect the terminals of the rotary machine to the positive pole and the negative pole of the DC power supply source. For example, it may be formed of switching devices for selectively turning on and off connection between voltage application sections for applying three or more voltages of different voltage values to phases of a multi-phase rotary machine and the terminals of the rotary machine. The power conversion circuit for applying voltages of different voltage values to the terminals of the rotary machine may be a circuit, which is disclosed, for example, in JP 2006-174697A.

What is claimed is:

1. A control system for a rotary machine comprising:
a power conversion circuit, which includes switching devices and controls a control amount including at least one of current, torque and flux linkage of the rotary machine by turning on and off the switching devices, the switching devices turning on and off connection of voltage supply sections, which supply respective voltages different one another, and terminals of the rotary machine;
an estimation section, which sets provisionally switching modes indicating an on/off condition of each of the switching devices and estimates the control amount with respect to each of the switching modes;
a determination section, which determines a switching mode based on an estimation result of the estimation section, the determined switching mode being used to actually drive the power conversion circuit; and
a drive section for driving the power conversion circuit in correspondence to the determined switching mode,
wherein the estimation section estimates the control amount or a change amount based on inductance information of the rotary machine, the change amount corresponding to the switching mode provisionally set for a parameter for calculating the control amount, and
wherein the inductance indicated by the inductance information has a value, which is different from a ratio between the current flowing in the rotary machine and the flux linkage;
wherein the estimation section includes:
an average voltage calculation section for calculating an average value of an output voltage of the power conversion circuit;
an instantaneous voltage calculation section for calculating an instantaneous voltage as a difference of the output voltage of the power conversion circuit corresponding to the provisionally set switching mode relative to the average value calculated by the average voltage calculation section; and a change amount estimation section for estimating the change amount based on the instantaneous voltage and the inductance in formation.

2. The control system for a rotary machine according to claim 1, wherein:
an absolute value of the value of the inductance indicated by the inductance information in a range, in which the torque of the rotary machine is equal to or larger than a threshold value, is smaller than an absolute value of a ratio of the flux linkage relative to the current flowing in the rotary machine.

3. The control system for a rotary machine according to claim 2, wherein:
the value of the inductance indicated by the inductance information in a range, in which the torque of the rotary machine is less than the threshold value, is the same as the ratio of the flux linkage relative to the current flowing in the rotary machine.

4. The control system for a rotary machine according to claim 1, wherein:
the value of the inductance indicated by the inductance information is variably set in accordance with at least one of the current flowing in the rotary machine and a rotation angle of the rotary machine.

5. The control system for a rotary machine according to claim 1, wherein:
the average voltage calculation section inputs the current flowing in the rotary machine and calculates the average value based on the inductance information;
the value of the inductance indicted by the inductance information used in calculating the change amount by the change amount estimation section is a value of a transient-state inductance, which is a ratio between a small change amount in the current flowing in the rotary machine and a small change amount in the flux linkage; and
the value of the inductance indicated by the inductance information used in estimating the average value by the average voltage calculation section is a steady-state inductance, which is a ratio between the current flowing in the rotary machine and the flux linkage.

6. The control system for a rotary machine according to claim 1, wherein:
the change amount estimation section estimates the control amount or the change amount by estimation of change amounts of components on a d-axis and a q-axis; and
the inductance indicated by the inductance information used for estimating the change amounts of components includes at lease one of a cross-coupling inductance, which indicates a ratio between a current of the d-axis and flux linkage of the q-axis, and a cross-coupling inductance, which indicates a ratio between a current of the q-axis and flux linkage of the d-axis.

7. The control system for a rotary machine according to claim 6, wherein:
a value of the cross-coupling inductance is set variably in accordance with at least one of the current of the rotary machine and the rotation angle of the rotation machine.

8. The control system for a rotary machine according to claim 6, wherein:
a value of the cross-coupling inductance is set to zero when the current flowing in the rotary machine is lower than a threshold value.

9. A control system for a rotary machine comprising:
a power conversion circuit, which includes switching devices and controls a control amount including at least one of current, torque and flux linkage of the rotary machine by turning on and off the switching devices, the switching devices turning on and off connection of voltage supply sections, which supply respective voltages different one another, and terminals of the rotary machine;
an estimation section, which sets provisionally switching modes indicating an on/off condition of each of the switching devices and estimates a control amount with respect to each of the switching modes based on inductance information;
a determination section, which determines a switching mode based on an estimation result of the estimation section, the determined switching mode being used to actually drive the power conversion circuit; and
a drive section for driving the power conversion circuit in correspondence to the determined switching mode,
wherein the estimation section includes:
an average voltage calculation section for inputting the current flowing in the rotary machine and calculating an average value of an output voltage of the power conversion circuit based on a steady-state inductance indicated by the inductance information;
an instantaneous voltage calculation section for calculating an instantaneous voltage as a difference of the output voltage of the power conversion circuit corresponding to the provisionally set switching mode relative to the average value calculated by the average voltage calculation section; and
a change amount estimation section for estimating a control amount or a change amount based on a transient-state inductance, which is different from the steady-state inductance and indicated by the inductance information, and the instantaneous voltage,
the control amount being an object of estimation by the estimation section, and the change amount corresponding to the switching mode provisionally set for a parameter for calculating the control amount.

10. The control system for a rotary machine according to claim 9, wherein:
a value of the steady-state inductance is variably set in accordance with at least one of the current flowing in the rotary machine and a rotation angle of the rotary machine.

11. The control system for a rotary machine according to claim 9, wherein:
the change amount estimation section estimates the control amount or the change amount by estimation of change amounts of components on a d-axis and a q-axis; and
the inductance indicated by the inductance information used for estimating the change amounts of components includes at lease one of a cross-coupling inductance, which indicates a ratio between a current of the d-axis and flux linkage of the q-axis, and a cross-coupling inductance, which indicates a ratio between a current of the q-axis and flux linkage of the d-axis.

12. The control system for a rotary machine according to claim 11, wherein:
a value of the cross-coupling inductance is set variably in accordance with at least one of the current of the rotary machine and the rotation angle of the rotation machine.

13. The control system for a rotary machine according to claim 11, wherein:
a value of the cross-coupling inductance is set to zero when the current flowing in the rotary machine is lower than a threshold value.

* * * * *